United States Patent Office 2,716,657
Patented Aug. 30, 1955

---

2,716,657

METHOD OF PRODUCING ORTHOPHOSPHORIC ACID ESTERS

Horst Bretschneider, Frankfurt am Main, Germany, assignor to Metallgesellschaft AG, Frankfurt am Main, Germany, a German corporation No Drawing. Application October 17, 1950, Serial No. 190,670. In Germany February 26, 1949

Public Law 619, August 23, 1954
Patent expires February 26, 1969

4 Claims. (Cl. 260—461)

This invention relates to a method of producing orthophosphoric acid esters.

It is known that esters of orthophosphoric acid can be produced from oils and fats and their acids, provided that they still contain esterifiable hydroxyl groups, and also in particular from long-chain aliphatic alcohols or from phenols and their alkylation products and the like, by the action of esterifiable phosphoric acid derivatives, such as phosphoric anhydride, phosphorus oxychloride, or acetyl phosphoric acid. These orthophosphoric acid esters of their alkali and amine salts constitute valuable products, which are used in lubricating and anti-corrosion agents, and also as textile treatment agents.

Amongst the phosphorus compounds suitable for the production of orthophosphoric acid esters, the use of phosphorus oxychloride offers particular advantages over the others; while esterification by means of acetyl phosphoric acid, i. e. a mixture of phosphorus trichloride and acetic acid or phosphoric acid and acetyl chloride (cf. German patent specification No. 619,019), necessitates the introduction into the process of substances which are extraneous to the reaction and difficultly removable from the reaction product, and also the use of phosphorus pentoxide leads to water soluble products only when a large excess of the acid component is applied (cf. German patent specification No. 575,660), esterification by means of phosphorus oxychloride precludes the obligatory introduction into the reaction product of extraneous substances which may on occasion be detrimental. Applied in excess, phosphorus oxychloride, being a volatile compound, can easily be removed by distillation after the reaction, and thus leads to substantially more uniform products.

The production of orthophosphoric acid esters by the use of phosphorus oxychloride nevertheless frequently encounters difficulties of a different type. The alcohols or hydroxyl-containing organic compounds treated therewith, particularly when these are compounds containing secondary hydroxyl groups, display a tendency to be converted, under the influence of the acid chloride, or of the hydrogen chloride forming, into the corresponding unsaturated hydrocarbons, splitting off water, or into resinification products, generally accompanied by discolouration, thus being lost for the desired reaction.

In order to reduce the danger of olefin formation, or decomposition of the hydroxyl-containing compounds used, the reaction temperature in the production of these phosphoric acid esters must therefore be kept as low as possible. In order to facilitate the consequently slowed down volatilisation of the hydrogen chloride forming from the reaction mixture, it has already been proposed to work under reduced pressure. In addition, however, the conversion does not in all cases proceed quickly, as might be expected. The lowering of the reaction temperature therefore entails a further slowing-down of the course of the reaction, so that in order to obtain a good yield it is necessary to heat, for example, for 18 hours.

It has also been proposed, in order to facilitate the splitting off of hydrogen chloride and to shorten the reaction time, to use catalysts, such as copper powder or metal chlorides (cf. American patent specification No. 2,005,619).

It has now been found that the reaction of organic compounds with phosphorus oxychloride to form orthophosphoric acid esters can be greatly accelerated, the yield improved, and at the same time the tendency to decompose and become discoloured, for example to form olefins, of many of these organic compounds in the presence of phosporus oxychloride or hydrogen chloride, can be halted, if small amounts of phosphorus trichloride are added to the reaction mixture.

The process of the present invention is particularly suitable for the production of single or mixed orthophosphoric acid esters from hydroxyl compounds. The esters of orthophosphoric acid of long-chain primary and secondary aliphatic and alicyclic alcohols, and also of alkyl phenols, alkyl naphthols, and the like, can be produced in this manner without special precautions, such as lower temperature or reduced pressure.

The hereindescribed process is however suitable not only for the reaction of organic hydroxyl compounds with phosphorus oxychloride, but also of other organic compounds which are likewise able to form esters. Such compounds are cyclic ethers, particularly alkylene oxides, for example ethylene oxide, propylene oxide, tetrahydrofuran, mono- and dianhydrohexites, of which the open hydroxyl groups are substituted, for example esterified.

The products obtained with a better yield are largely free from undesirable subsidiary or decomposition products and thus almost always of substantially lighter colour.

The quantity of the phosphorus trichloride added amounts in general to only a few percent of the phosphorus oxychloride used for the reaction. In the case of organic ester components particularly sensitive to acid media, it may be necessary to increase the addition of phosphorus trichloride. The phosphorus trichloride added is not consumed in certain circumstances, particularly in the production of phosphoric acid monoesters, in which the phosphorus chlorides are conveniently used as a whole in excess, and can be recovered together with the unconsumed phosphorus oxychloride by distillation. It is however also possible to remove the phosphorus chlorides from the reaction product with the aid of water.

The methods of applying the phosphorus trichloride are of any desired kind; the only essential is its use during the course of the reaction. For example, it is frequently convenient first to add the phosphorus trichloride alone to the organic compounds to be reacted. It may however also be mixed with the phosphorus oxychloride, or a commencing decomposition or decolouration in a reaction mixture may be stopped by subsequent addition or increasing of the proportion of phosphorus trichloride.

The simultaneous use of phosphorus trichloride in the reaction mixture has the advantage over other methods of operation, for example that in which catalysts such as copper powder or metal chlorides are used to accelerate the reaction, in that it does not introduce extraneous substances into the reaction product, which in certain circumstances may decisively influence the value of the final product, as the subsequent removal of the extraneous substances from the generally viscous water-soluble final products is in general often not possible.

In accordance with the hereindescribed process, by the suitable selection of the molecular ratios of the substances participating in the reaction, mone-, di-, or tri-esters can be produced, and also, when using mixtures of hydroxyl-containing compounds, such as are obtained for example in the catalytic hydrogenation of natural fats, mixed esters. Cyclic, aromatic, or aliphatic alcohols, and also cyclic ethers, either singly or in mixtures, can also be reacted, while esters mixed in any desired manner and having desired properties can be produced from the aforementioned components.

Orthophosphoric acid esters produced according to the invention are suitable, particularly on account of their light colour, for cosmetic and pharmaceutical purposes, but may for example also be used in the textile, tanning, and leather industries.

The invention will be illustrated by the following non-limitative examples:

*Example 1*

46 parts of an alcohol of the mean chain length $C_{12}$, which was produced from the corresponding olefine fraction by reaction with carbon monoxide and hydrogen in known manner (oxo synthesis), are dissolved in about 40 parts of benzene, and 43 parts of phosphorus oxychloride, with which 2% by weight of phosphorus trichloride is mixed, are slowly poured into the same. After the reaction, which is at first lively, has died down, the mixture is cooled under reflux conditions for ½ hour. The solution remains water-light and clear. After removal of the solvent and excess phosphorus chlorides by distillation, the remaining mass is stirred into a caustic soda solution of about 20% strength, with good cooling. An entirely white product is separated, which when separated from the sodium chloride containing base is clearly soluble in water with a neutral reaction.

*Example 2*

1.5 kg. of phosphorus trichloride is added to 300 kg. of stearin alcohol dissolved in benzene or other inert solvent, for example trichloroethylene, and thereupon 190 kg. of phosphorus oxychloride is slowly added. The solution is heated to boiling under reflux conditions until the generation of hydrogen chloride entirely ceases, the solution remaining light. After distilling off the readily boiling fractions (solvent and phosphorus chlorides), the remaining melt is stirred into water and the resulting acid phosphoric acid ester is washed free of hydrochloric acid.

*Example 3*

100 kg. of alkyl phenol (molecular weight 210) are mixed with 80 kg. of phosphorus oxychloride, to which 5 kg. of phosphorus trichloride has been added, and the mixture is heated to 110° C. for 2 hours. After driving off the volatile fractions from the reaction mass, this being finally achieved by blowing through air, said mass is converted by stirring in the calculated amount of water or blowing steam into the acid phosphoric acid ester.

*Example 4*

500 parts by weight of a polyoxyethylated phenol (mean molecular weight 640) and 125 parts by weight of phosphorus oxychloride, together with 10 parts of phosphorus trichloride, are re-acted at 100° C., as in the foregoing examples. Sufficient amounts of caustic soda solution for neutralisation are stirred into the reaction product with cooling; the concentration of the caustic soda solution can vary according to the intended further working-up of the neutral product.

*Example 5*

A mixture of 900 parts by weight of polyglycol (mean molecular weight 450) and 108 parts by weight of octadecylalcohol, dissolved in about 100 parts by volume of trichloroethylene is mixed with 61 parts by weight of $POCl_3$. The dark red colouration of the mixture which occurs and rapidly increases is halted or retarded by the addition of 3 parts by weight of $PCl_3$. The reaction, which starts spontaneously, is completed by boiling under reflux conditions for 1½ hours, and the product is then subjected to partial saponification by blowing-out with water vapour, splitting off the remaining P-bound chlorine, and also freed from the solvent.

An acid, readily foaming product is obtained which, if necessary after neutralisation, is suitable for example as a preparation medium for rayon.

*Example 6*

Ethylene oxide is introduced with stirring into 300 parts of phosphorus oxychloride to which 3 parts of phosphorus trichloride have been added, whereupon the reaction temperature rises to 110 to 120° C. After absorbing about 2 molecular equivalents of ethylene oxide, the reaction declines. The water-light reaction product consists for the predominant part of di-(betachloroethyl)-phosphoryl chloride. The crude reaction product is particularly suitable for further reactions for example with sodium nitrophenate or sodium chlorophenate, for the production of insecticidal and fungicidal substances.

*Example 7*

A reaction mixture, as described in Example 6, is reacted with ethylene oxide. After absorption of 2 molecular equivalents and after the temperature has fallen, the mixture is further heated to 120° C. and further ethylene oxide is introduced in a slow current, until there is no more absorption. The increase in weight amounts to a further molecular equivalent. By fractional distillation of the reaction product, tri(betachloroethyl) phosphate, with a boiling point of 180° C. at 2 mm. is obtained with a yield of 80%.

What I claim is:

1. A method for the production of orthophosphoric acid esters which comprises reacting organic hydroxyl compounds with phosphorus oxychloride in the presence of phosphorus trichloride.

2. A method for the production of orthophosphoric acid esters which comprises reacting hydroxyl compounds with at least 6 carbon atoms with phosphorus oxychloride in the presence of phosphorus trichloride.

3. A method for the production of orthophosphoric acid esters comprising reacting an alcohol with phosphorus oxychloride in the presence of phosphorus trichloride.

4. A method for the production of orthophosphoric acid esters which comprises reacting an esterifiable organic compound with phosphorus oxychloride in the presence of phosphorus trichloride while securing the presence of the phosphorus oxychloride until the reaction is completed.

References Cited in the file of this patent

UNITED STATES PATENTS

| | | |
|---|---|---|
| 1,936,985 | Lommel et al. | Nov. 28, 1933 |
| 1,945,183 | Clemmensen | Jan. 30, 1934 |
| 2,508,428 | Smith et al. | May 23, 1950 |

OTHER REFERENCES

Gottlieb, J. Am. Chem. Soc., vol. 54, pages 748–750 (1932).

Kosolapoff, Organo-phosphorus Compound, pages 226 229 (1950).